Nov. 4, 1958

E. N. CLARKE 2,859,140

METHOD OF INTRODUCING IMPURITIES INTO A SEMI-CONDUCTOR

Filed July 16, 1951

INVENTOR
EDWARD N. CLARKE
BY Paul S. Martin
ATTORNEY

United States Patent Office 2,859,140

Patented Nov. 4, 1958

2,859,140

METHOD OF INTRODUCING IMPURITIES INTO A SEMI-CONDUCTOR

Edward N. Clarke, Levittown, N. Y., assignor to Sylvania Electric Products Inc., a corporation of Massachusetts Application July 16, 1951, Serial No. 237,001

2 Claims. (Cl. 148—1.5)

Figure 1:
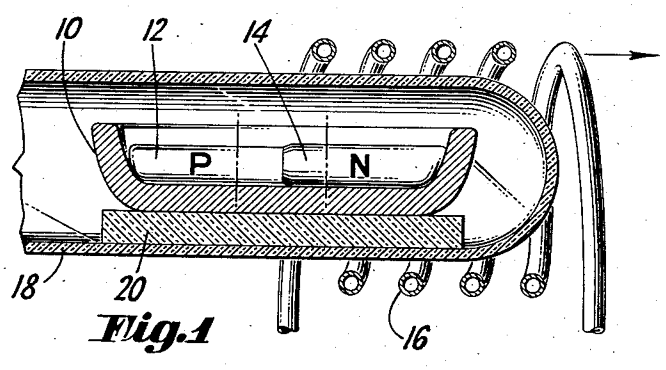

This invention relates to electrical translators and especially to the production of germanium transistors having rectifying barriers.

Highly purified germanium can be given an n-type or a p-type semiconductor characteristic in dependence upon the type of impurity that is present in the germanium. This semiconductor characteristic is made evident either by testing the germanium in the presence of a strong magnetic field under proper conditions for determining its Hall effect, or more directly, the germanium can be used as a rectifier with a large area contact and a sharp contact; and, depending on the results of such tests, the germanium is said to have either n- or p-type properties.

Various types of translators have been produced which employ a composite structure on n- and p-type germanium in one integral specimen of the germanium. It is known, for example, that if a quantity of germanium of controlled impurity is melted in a long crucible or "boat" and the specimen is very gradually allowed to cool starting on one end, the solidification progressing toward the opposite end, there is likely to be a region of n-type conductivity and an adjoining region of p-type conductivity; and between these regions there is an n-p barrier which has various desirable properties. The photoeffects of n-p barriers are valuable in the detection of light and especially of infrared radiation. Also an n-p barrier is highly effective as an area rectifier, in contrast to the so-called point contact rectifiers made with germanium and whisker contacts. A known way of producing n-p barriers is to cause sudden cooling of a molten quantity of germanium and after cutting the resulting ingot, to search with a probe for n and p areas, at the transition of which there exists an n-p barrier.

The happenstance production of n-p barriers is undesirable from various points of view. For example, in any production routine, the cost of making translators having n-p barriers in reliance upon searching for such barriers in a large specimen would obviously be excessive. Furthermore, the size of the n-p barriers produced in that manner is not subject to control and the electrical properties of the barrier, whether for photoeffects or for rectification, is also beyond reliable prediction.

An object of the present invention is to produce semiconductor devices with rectifying barriers in a predetermined location and of any desired predetermined area. A further object is to produce barriers in germanium in which the electrical properties of both dis-similar portions of the germanium are subject to control so that, for example, an n-p barrier will have the desired characteristics, which characteristics can be repeated with reasonable uniformity. A further object is to devise new methods of producing barriers in semi-conductors. N-p barriers are most effective, but effective rectifying barriers can be produced in which a high-resistivity portion of semiconductor of one type adjoins a low-resistivity portion of the same type. Thus high resistivity n-type germanium adjoining relatively low resistivity n-type germanium can be formed into an effective rectifier in one aspect of this invention.

In the illustrative examples detailed below, germanium of one type, either n or p, is assembled with germanium of the opposite characteristic and these are fused together. The n-type and the p-type germanium are respectively of predetermined physical properties and as a result the n-p barrier produced by fusing them together can be controlled for producing the desired properties of the n-p barrier. In concept, the two portions of n- and p-type respectively can both be maintained in solid state during this operation and the adjoining ends can be heated to the point of fusion; or the n-type portion can in its entirety be heated above the melting point in contact with p-type germanium in solid state. In these illustrative examples, the portions of n- and p-type germanium are assembled in an operation in which fusion is effected by differential heating. A form of weld may be produced, or the barrier may be formed otherwise, using a p-type specimen one portion of which is converted in situ to n-type and allowed to solidify.

Figure 2:
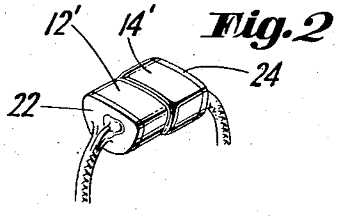
Figure 3:
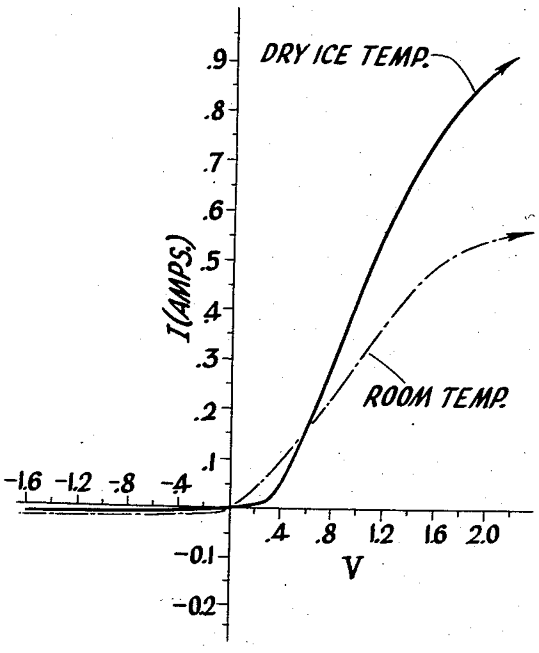
Figure 4:
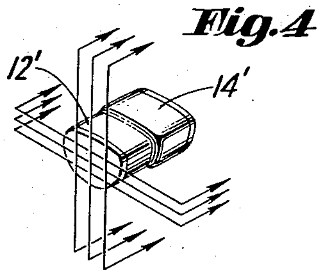
Figure 5:
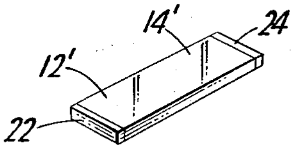

The invention and its various aspects and advantages will be better appreciated from the following detailed disclosure of illustrative examples. In the accompanying drawings, Fig. 1 is a diagrammatic illustration of an illustrative process for producing n-p barriers in semiconductors; Fig. 2 is an enlarged perspective view of a translator embodying an n-p barrier produced by a novel method; Fig. 3 is a rectification characteristic of a specimen such as that in Fig. 2; and Figs. 4 and 5 are perspective views illustrating subdivisions of a rectifier such as that in Fig. 2.

In the drawing a boat 10 as of graphite is shown containing a solid bar 12 of p-type germanium in endwise contact with a quantity of n-type germanium 14, this germanium being in molten state because of the differential heating produced by induction coil 16 surrounding the boat. Tube 18 as of Pyrex containing the boat is connected to a vacuum pump (not shown) so that germanium is processed in a vacuum of a high order such, for example, as $10^{-5}$ mm. of mercury. Conveniently, the graphite boat is supported on a block 20 of quartz inside tube 18.

The entire contents of boat 10 are considerably heated by the induction coil but the position of the coil is gradually adjusted so that all of the n-type charge is melted and the coil is withdrawn slightly as soon as the n-type germanium flows against the p-type germanium body. Thereafter the coil is very gradually withdrawn in the direction indicated by the arrow in Fig. 1 and the n-type germanium is allowed to solidify and form an integral bond with the p-type germanium in the boat.

The progressive cooling of the n-type germanium as gradually permitted under the control of coil 16, causes migration of much of the metallic impurities toward the end of the molten volume remote from the p-type portion. However, the n-p type barrier is produced exactly at the face of the p-type specimen, as nearly as can be determined by probing the resulting unit with a whisker in a rectifying circuit; and the n-p barrier is found to exist all the way through the specimen at that position as determined by probing slices of the ingot taken longitudinally through the specimen. If some limited part of the p-type germanium should melt, it would become diffused into the n-type bulk. N-type impurities therein would destroy its p-type identity and convert it to n-type germanium. The molten volume therefore fixes the location of the barrier formed after solidification. The coil is removed from the boat at a very gradual rate as stated above, the entire boat being perhaps 3 inches long and the rate of withdrawal of the coil being approximately 1 inch per hour.

After the specimen is completed in the form shown in Fig. 1, the n-p barrier can be separated from the remainder of the n- and p-type material not required in the translator by transversely cutting the ends of the ingot away, as with a diamond wheel. Note the parallel vertical broken lines across the ingot in Fig. 1, indicating desirable places for such cuts. The cut surfaces can then be copper-plated for effective electrical connection so as to produce the translator shown in Fig. 2 in which portion 12' is primarily of p-type conductivity and the portion 14' is primarily of n-type conductivity. The n-p barrier between them normally is detectable at the surface of the device by visual examination. The germanium may contain minor amounts of both n- and p-type impurities (donor and acceptor atoms) but is either of n-type or p-type conductivity in dependence on the predominant effect of either class of impurities which it contains. The unit in Fig. 2 is copper plated at its ends so as to provide terminals 22, 24, affording easy electrical connections.

The p-type germanium can conveniently be made by reducing germanium oxide furnished by the Eagle Picher Lead Company of a very high order of purity and the reduced oxide, metallic germanium powder, can be fused into an ingot of p-type conductivity by maintaining it molten over a period of perhaps two hours and thereafter permitting gradual progressive solidification from end to end in a vacuum, under control of a coil such as is shown in Figure 1. N-type germanium can be produced in an initial step by melting the p-type germanium, such as that produced as above, with a limited percentage of a so-called donor constituent, whether metal or gas. The n-type germanium used in rectifiers of the 1N34 point-contact category is commonly formed by melting about 1% of tin with a quantity of germanium powder reduced from Eagle Picher germanium oxide. By virtue of slow, progressing cooling of the melt, the tin migrates so as to have large concentrations of it at the end of the ingot last to solidify; and concentrations of tin will also appear at grain boundaries so as not to be alloyed with the germanium. The amount of tin that is believed to enter into the germanium lattice is that of a very low order but nevertheless the n-type semiconductor characteristic is very definitely produced with the addition of a known fractional percentage of tin. The various other donor impurities similarly impart n-type semiconductor properties.

In an alternative procedure, it is possible to produce an n-p barrier by using a piece of p-type germanium of the right size and shape to fill boat 10 in Fig. 1, and to convert a portion of its length to n-type in situ. Instead of preparing n-type germanium for physical assembly to the p-type piece in the boat, it is feasible to deposit a thin layer of metal on one end of the p-type germanium in the boat extending perhaps one-half of its length to the place where the n-p barrier is to be established. For example, about 0.2 grams of powered tin can be distributed over about one inch of a 10-gram germanium ingot two inches long. By gradually moving coil 16 toward the boat (in the direction opposite the arrow) the ingot can be melted at the tin-covered end and the tin allowed to infuse. Thereafter the coil can be withdrawn in the direction of the arrow so as to allow cooling of the ingot and withdrawal of much of the tin to the end last cooled. The portion of the ingot in which the tin was deposited is found by testing to be of n-type conductivity and the formation of an n-p barrier is clearly evident by virtue of the photoeffects and the rectification effected between the n and p regions.

The rectifying barrier formed is greatly enhanced by subdivision through cuts, as with a diamond wheel, across the boundary (Fig. 4) and thereafter etching the cut surfaces. The usual etching reagents may be used. A greatly enlarged semiconductor is shown in Fig. 5 having a barrier (readily detected by probe or light beam exploration) extending completely through the body. A typical area rectifier of germanium made as described above of n- and p-type portions yielded the rectifying characteristics in Fig. 3 which, it will be observed, is notable for high forward current, compared to point-contact diodes of germanium.

The foregoing represents a preferred embodiment of the invention, including several desirable variations, but nonetheless those skilled in the art will recognize that further variations in detail may be made, and while a rectifier is shown other applications will be apparent. Therefore the appended claims should be accorded due latitude of interpretation, consistent with the scope and spirit of the invention.

What is claimed is:

1. The method of making a semiconductor translator having a rectiflying barrier, including the steps of preparing a first body of semiconductor of one characteristic, fusing a body of semiconductor of another characteristic, holding the fused body in contact with said first body and establishing a temperature gradient from that of the molten state, declining in the direction away from the first body, and thereafter by controlled use of heat gradually shifting the temperature gradient in said direction and thereby permitting gradual cooling of the fused body.

2. The method of introducing an impurity into a body of semiconductor, including the steps of supporting a body of semiconductor at one end of a comparatively long crucible, said body being of predetermined characteristics, depositing a further charge including solid semiconductor material together with a separate modicum of a selected impurity in the crusible laterally of said body, locally heating and melting said further charge so as to flow into bonding contact with said body, and gradually shifting the heat application away from said body in a direction solidifying said charge progressively from the region in contact with said body to the region furthest removed from said body to produce a unitary body of semiconductor bonded to the original body wherein the added body contains said impurity.

References Cited in the file of this patent

UNITED STATES PATENTS

| | | |
|---|---|---|
| 2,221,596 | Lorenz | Nov. 12, 1940 |
| 2,402,582 | Scaff | June 25, 1946 |
| 2,560,594 | Pearson | July 17, 1951 |
| 2,561,411 | Pfann | July 24, 1951 |
| 2,569,347 | Shockley | Sept. 25, 1951 |
| 2,588,254 | Lark-Horovitz et al. | Mar. 4, 1952 |
| 2,597,028 | Pfann | May 20, 1952 |
| 2,629,672 | Sparks | Feb. 24, 1953 |
| 2,708,646 | North | May 17, 1955 |